(12) United States Patent
Vitali

(10) Patent No.: US 11,927,443 B2
(45) Date of Patent: Mar. 12, 2024

(54) TEMPORAL DIFFERENTIAL SENSING STRUCTURE FOR VIBRATING GYROSCOPE

(71) Applicant: STMICROELECTRONICS, INC., Coppell, TX (US)

(72) Inventor: Andrea Lorenzo Vitali, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 17/881,470

(22) Filed: Aug. 4, 2022

(65) Prior Publication Data

US 2024/0044646 A1 Feb. 8, 2024

(51) Int. Cl.
*G01C 19/5712* (2012.01)

(52) U.S. Cl.
CPC ................ *G01C 19/5712* (2013.01)

(58) Field of Classification Search
CPC .................................................. G01C 19/5712
See application file for complete search history.

(56) References Cited

U.S. PATENT DOCUMENTS

| | | | | |
|---|---|---|---|---|
| 8,213,437 | B2* | 7/2012 | Terazawa | G01P 15/125 375/357 |
| 8,387,472 | B2 | 3/2013 | Cipriano et al. | |
| 10,234,477 | B2 | 3/2019 | Anac et al. | |
| 2011/0056291 | A1* | 3/2011 | Nakamura | G01C 19/5719 73/504.12 |
| 2015/0160011 | A1* | 6/2015 | Nakajima | G01C 19/5776 702/56 |
| 2015/0160012 | A1* | 6/2015 | Ii | G01C 19/5776 73/504.12 |
| 2016/0046485 | A1* | 2/2016 | Weber | G01C 19/5712 73/504.12 |
| 2018/0031601 | A1* | 2/2018 | Anac | G01C 19/5726 |
| 2019/0310106 | A1* | 10/2019 | Furuta | G01C 19/5776 |

(Continued)

OTHER PUBLICATIONS

Fei et al., "System Identification of MEMS Vibratory Gyroscope Sensor," *Mathematical Problems in Engineering*, 2011(829432):1-12, 2011.

(Continued)

*Primary Examiner* — David J Bolduc
(74) *Attorney, Agent, or Firm* — Seed IP Law Group LLP

(57) ABSTRACT

A microelectromechanical device is provided. A vibrating structure gyroscope included in the device employs a temporal differential sensing method alone or a spatial differential sensing method in combination with the temporal differential sensing method. When used in combination, the temporal sensing method may be applied before the spatial sensing method or applied after the spatial sensing method. The temporal differential sensing samples signals at times t1 and t2 when velocity of a sensing mass within the vibrating structure gyroscope is maximum and has an opposite sign. The temporal sensing method improves Euler and Centrifugal forces cancellation and increases the signal to noise ratio if forces remain equal at times t1 and t2. Applying a high sampling speed can result in times t1 and t2 being sufficiently close to each other and therefore cancel any error terms associated with Euler and Centrifugal forces.

20 Claims, 8 Drawing Sheets

(56) References Cited

U.S. PATENT DOCUMENTS

2020/0088518 A1  3/2020  Endean
2020/0200537 A1  6/2020  Ceisel et al.

OTHER PUBLICATIONS

Lavrik et al., "Optically read Coriolis vibratory gyroscope based on a silicon tuning fork," *Microsystems & Nanoengineering,* 5(47):1-11, 2019.

* cited by examiner

TEMPORAL DIFFERENTIAL SENSING STRUCTURE FOR VIBRATING GYROSCOPE

BACKGROUND

Technical Field

The present disclosure relates to a vibrating gyroscope.

Description of the Related Art

Vibrating structure gyroscopes in the related art are based on a spatial differential sensing structure. For instance, two sensing elements for each axis moving in opposite direction are subject to Coriolis forces. A vibrating proof mass in gyroscopes is not only subject to the acceleration force but also to Euler force, Centrifugal force, and Coriolis force. The Coriolis force is proportional to an angular velocity and is a key component among the forces. The sensing structure is designed to minimize the measured effect of the acceleration force, Euler force, and Centrifugal force while maximizing the effect of the Coriolis force. This is achieved by a spatial differential sensing structure where signals coming from two sensing element moving in opposite directions are subtracted. That is, acceleration force is cancelled. However, the Euler force and Centrifugal force are not completely cancelled.

Vibrating structure gyroscopes in the related art reduce Euler and Centrifugal forces by increasing the velocity of the masses (e.g., increasing vibration velocity of the proof mass) of the gyroscope and by reducing their distances. However, this approach is problematic in the sense that it increases complexity and power consumption.

BRIEF SUMMARY

One or more embodiments of the present disclosure relate to a temporal differential sensing structure for a vibrating gyroscope.

A vibrating structure gyroscope utilizing spatial differential sensing structure leaves error terms with respect to Euler and Centrifugal forces. While the spatial differential sensing method in the related art may reduce or minimize the error terms due to Euler and Centrifugal forces, completely canceling these error terms due Euler and Centrifugal forces is not possible by merely utilizing the spatial differential sensing method. The temporal differential sensing method and the temporal differential sensing structure utilizing the same in a vibrating gyroscope can subtract signals coming from a same element to cancel all error terms due Euler and Centrifugal forces.

BRIEF DESCRIPTION OF THE SEVERAL VIEWS OF THE DRAWINGS

Reference will now be made by way of example to the accompanying drawings. In the drawings, identical reference numbers identify similar elements or acts. In some drawings, however, different reference numbers may be used to indicate the same or similar elements. The shapes of various elements and angles are not necessarily drawn to scale, and some of these elements may be enlarged and positioned to improve drawing legibility.

DETAILED DESCRIPTION

Figure 1A:
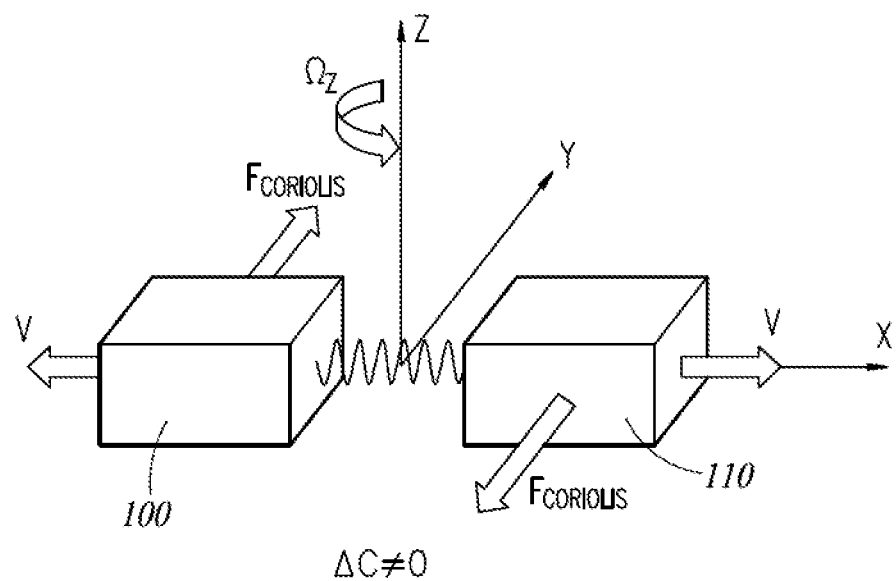
FIG. 1A is a diagram showing various forces including Coriolis force involved in a micro-electromechanical systems (MEMS) gyroscope when angular velocity is applied.

Technical advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted.

In describing a position relationship, when a position relation between two parts is described as, for example, "on," "over," "under," "adjacent," or "next," one or more other parts may be disposed between the two parts unless a more limiting term, such as "just" or "direct(ly)," is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments as mentioned above.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

Gyroscopes are commonly used sensors for measuring angular velocity in many areas of applications such as navigation and control stabilization (e.g., controlling airplanes, or the like). Vibratory gyroscopes are the devices that transfer the angular velocity from one axis to another axis through Coriolis forces. The conventional mode of operation drives the proof masses of the gyroscope into a known oscillatory motion along one axis and then detects the Coriolis acceleration along the other orthogonal axes. The measured acceleration provides information about the applied angular velocity.

A typical MEMS vibratory gyroscope sensor configuration includes a proof mass suspended by spring beams, electrostatic actuations, and sensing mechanisms for forcing an oscillatory motion and sensing the position and velocity of the proof mass as well as a rigid frame which is rotated along the rotation axis. Dynamics of a MEMS gyroscope sensor is derived from Newton's law in the rotating frame. The principles of how vibrating gyroscopes operate will be further detailed in the following description in conjunction with the illustrated drawings.

Figure 1B:
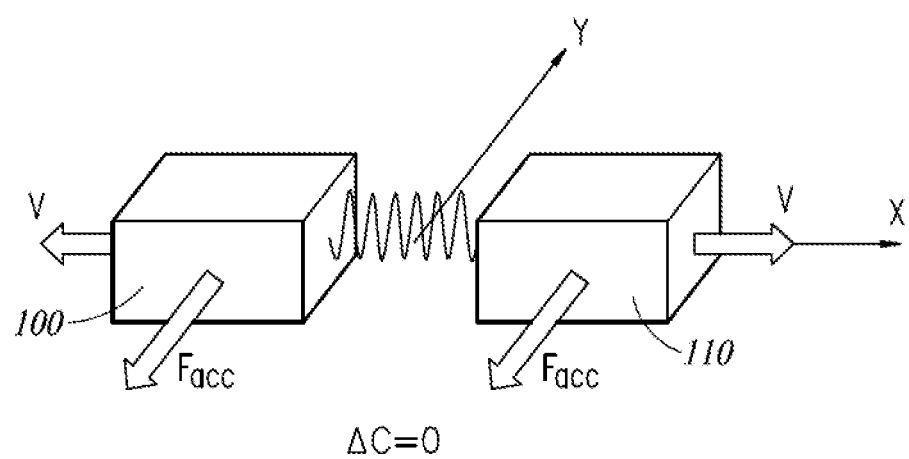
FIG. 1B is a diagram showing various forces including acceleration force involved in a MEMS gyroscope when acceleration is applied.

FIG. 1A is a diagram showing various forces including Coriolis force involved in a micro-electromechanical systems (MEMS) gyroscope when angular velocity is applied. FIG. 1B is a diagram showing various forces including acceleration force involved in a MEMS gyroscope when acceleration is applied.

Referring to FIG. 1A, two proof masses 100, 110 oscillate within an electronic device such as a MEMS gyroscope. The mass 100 and the mass 110 move constantly in opposite directions (see v in FIG. 1A). When an angular velocity ($\Omega_z$) is applied along the z-axis, the Coriolis force ($F_{Coriolis}$) on each mass also acts in opposite directions (see the $F_{Coriolis}$ of mass 100 in the +y direction and the $F_{Coriolis}$ of mass 110 in the −y direction). The differential value in capacitance ΔC is then used to measure rotation.

Referring to FIG. 1B, similar to FIG. 1A, two proof masses 100, 110 oscillate within a MEMS gyroscope. That is, the mass 100 and the mass 110 move constantly in opposite directions (see v in FIG. 1A). When an acceleration is applied, the acceleration force ($F_{acc}$) on each mass is in the same direction (see the $F_{acc}$ of mass 100 in the −y direction and the $F_{acc}$ of mass 110 in the −y direction). That is, when linear acceleration is applied to the two masses, they move in the same direction and the differential capacitance ΔC is zero.

The above describes the basic principle of how various measurements are sensed and calculated in a MEMS gyroscope. In the subsequent paragraphs, all the forces involved in a vibrating structure gyroscope and the technical problems identified by using a spatial differential sensing method or spatial differential sensing structure using the same method in the related art will be explained.

In a vibrating structure gyroscope, proof masses 100, 110 are kept under vibration along one axis and are free to oscillate on the other two axis. Here, proof masses 100, 110 vibrate along the x-axis and are free to oscillate on the other two axis, y-axis and z-axis. The proof masses are subject to the following forces, × being a cross-vector product. The forces (or force information) include 1) acceleration force, 2) Centrifugal force, 3) Euler force, and 4) Coriolis force, which are based on Newton's law.

Acceleration force $F_{acc}$ or $F_a$ is represented as m·l, where m is mass and l is linear acceleration. Centrifugal force $F_f$ is represented as m·w×(w×r), where w is angular velocity and r is position. Euler force $F_e$ is represented as m·w'×r, where w' is first derivative of w. Coriolis force $F_{Coriolis}$ or $F_e$ is represented as m·2·w×r', where r' is first derivative of r (which becomes velocity).

The total force F (F=m·a) is calculated by summing all the forces involved. That is, $F=F_a+F_f+F_e+F_c$. Here, the common term m (mass) can be deleted (that is, divided from both sides of the equation). Therefore, the total acceleration can be represented as:

$$a=l+w\times(w\times r)+w'\times r+2\cdot w\times r'.$$

Here, for two vibrating elements (e.g., 2 vibrating proof masses), this corresponds to a=l+(ww+w')r+2wr'. This can be further represented as follows:

$$\begin{vmatrix} a1x & a2x \\ a1y & a2y \\ a1z & a2z \end{vmatrix} =$$

$$\begin{vmatrix} lx & lx \\ ly & ly \\ lz & lz \end{vmatrix} + \begin{vmatrix} -(wy^2+wz^2) & (wx\,wy-wz') & (wx\,wz+wy') \\ (wx\,wy+wz') & -(wx^2+wz^2) & (wy\,wz-wx') \\ (wx\,wz-wy') & (wy\,wz+wx') & -(wx^2+wy^2) \end{vmatrix} \begin{vmatrix} r1x & r2x \\ r1y & r2y \\ r1z & r2z \end{vmatrix} +$$

$$2\begin{vmatrix} 0 & -wz & +wy \\ +wz & 0 & -wx \\ -wy & +wx & 0 \end{vmatrix} \begin{vmatrix} r1x' & r2x' \\ r1y' & r2y' \\ r1z' & r2z' \end{vmatrix}$$

Further, radius rx is represented as rx=xconst+/−(dx+x(t)), where x(t) is indicative of the oscillation, x'(t) is the first derivative. If x is sinusoidal, then x=0 when x' is at peak (positive or negative). This is the same for elements along the y-axis.

Here, an element along the x-axis is used as an example. A person of ordinary skill in the art would understand that similar calculation can be done along the other axes as necessary. The mathematical equation for a proof mass vibrating along one axis (x-axis is the example here) in equal and opposite directions can be represented as:

r1x=rx+dx+x(t), r2x=rx−dx−x(t), while r1y=r2y=0 and r1z=r2z=0.

Here, r1x−r2x=2 (dx+x), x=0 when x' at peak.

r1x'=x'(t),r2x'=−x'(t), while r1y'=r2y'=0 and r1z'=r2z'=0.

Here, r1x'−r2x'=2x'.

Now, spatial differential sensing using two elements vibrating along x-axis can be represented as follows:

a1y−a2y=(1y−1y)+(wx wy+wz')(r1x−r2x)−(wx^2+wz^2)(r1y−r2y)+(wy wz−wx')(r1z−r2z)+2wz(r1x'−r2x').    Equation (1):

a1z−a2z=(1z−1z)+(wx wz−wy')(r1x−r2x)+(wy wz+wx')(r1y−r2y)−(wx^2+wy^2)(r1z−r2z)−2wy(r1x'−r2x').    Equation (2):

With respect to Equation (1), as previously noted above, 1y–1y is 0 and r1y–r2y is 0. This results in simplifying a1y–a2y.

a1y–a2y can now be represented as:

$$a1y-a2y=0+(wx\ wy+wz')2(dx+x)+0+0+2wz(2x').$$

That is, (wx wy+wz') 2(dx+x) and 2 wz (2 x') are the only terms left (residual terms) in Equation (1).

With respect to Equation (2), as previously noted above, 1z–1z is 0, r1y–r2y is 0, and r1z–r2z is 0. This results in simplifying a1z–a2z.

a1z–a2z can now be represented as:

$$a1z-a2z=0+(wx\ wz-wy')2(dx+x)+0+0+-2wy(2x').$$

That is, (wx wz–wy') 2(dx+x)–2 wy (2 x') are the only terms left (residual terms) in Equation (2).

Based on the residual terms in both Equations (1) and (2), it shows that the residual unwanted terms are due to Centrifugal force (wx wy and wx wz components) and Euler force (wz' and wy' components). As explained previously, these residual unwanted terms can be minimized by reducing dx or dy distance between sensing elements (e.g., proof masses) in a MEMS gyroscope in the related art. On the other hand, wanted terms proportional to Coriolis force can be maximized by increasing x' or y' velocity of the sensing element.

An optimal design of a vibrating structure gyroscope minimizes dx and maximizes x'. Further, a best signal to noise ratio (SNR) is obtained by sampling when abs(x') and abs(y') are at a peak (e.g., that is signals are sampled at peak absolute velocity and opposite sign). However, the spatial differential sensing method utilized in the related art, cannot cure the deficiencies within its method due to the fact that it cannot cancel out the residual unwanted terms due to Centrifugal force (wx wy and wx wz) and Euler force (wz' and wy').

Figure 2A:
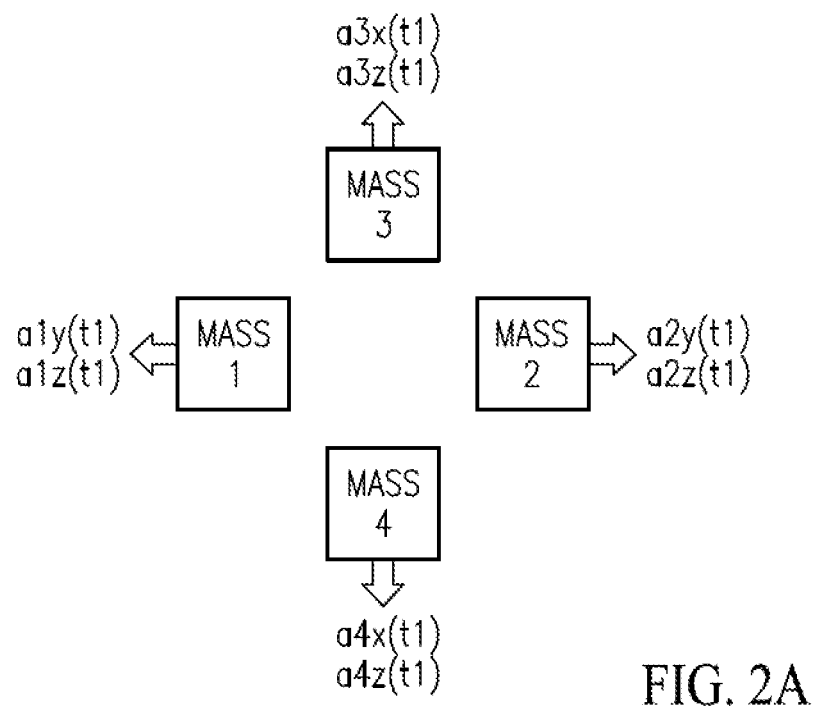
FIG. 2A illustrates a diagram of the x, y, z components involved in a vibrating structure gyroscope at sampling time t1.
Figure 2B:
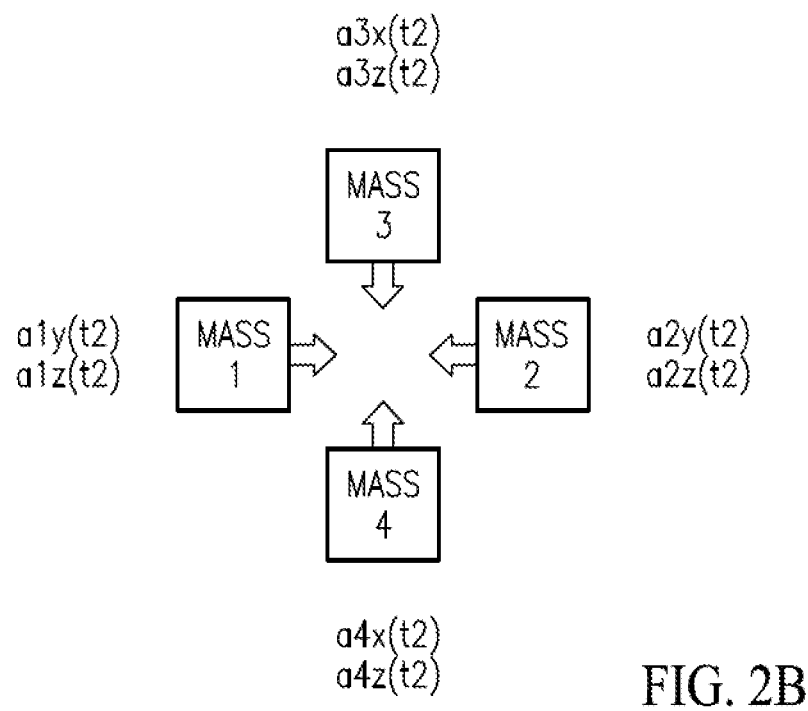
FIG. 2B illustrates a diagram of the x, y, z components involved in a vibrating structure gyroscope at sampling time t2.

FIGS. 2A and 2B show a planar MEMS gyroscope having four elements (e.g., four proof masses), two elements vibrating along an x-axis and two elements vibrating along a y-axis.

In particular, FIG. 2A illustrates a diagram of the x, y, z components (e.g., acceleration) involved in a vibrating structure gyroscope at sampling time t1 an FIG. 2B illustrates a diagram of the x, y, z components involved in a vibrating structure gyroscope at sampling time t2.

In FIG. 2A, the maximum velocity is shown to be in one direction (direction outwards) at sampling time t1 and in FIG. 2B, the maximum velocity is shown to be in the opposite direction (direction inwards) at sampling time t2.

As shown in FIG. 2A, the acceleration components involved with respect to each mass is described. For example, a1y and a1z components are associated with mass 1 at time t1, a2y and a2z components are associated with mass 2 at time t1, a3x and a3z components are associated with mass 3 at time t1, a4x and a4z components are associated with mass 4 at time t1.

Similarly, in FIG. 2B, a1y and a1z components are associated with mass 1 at time t2, a2y and a2z components are associated with mass 2 at time t2, a3x and a3z components are associated with mass 3 at time t2, a4x and a4z components are associated with mass 4 at time t2.

Similar calculations with respect to FIGS. 1A and 1B may be performed, herein. That is, the proof mass is subject to the following forces: 1) acceleration force, 2) Centrifugal force, 3) Euler force, and 4) Coriolis force.

The total force F (F=m·a) is calculated by summing all the forces involved. That is, F=acceleration force $F_a$+Centrifugal force $F_f$+Euler force $F_e$+Coriolis force $F_c$. Here, the common term m (mass) can be deleted. Therefore, the total acceleration can be represented as:

$$a=1+w\times(w\times r)+w'\times r+2\cdot w\times r'.$$

This equation is further described with respect to the acceleration components along the axes.

$$a12y=a1y-a2y \quad \text{Equation (3):}$$

$$a12z=a1z-a2z \quad \text{Equation (4):}$$

$$a34x=a3x-a4x \quad \text{Equation (5):}$$

$$a34z=a3z-a4z \quad \text{Equation (6):}$$

Based on calculating the total acceleration based on a=1+w×(w×r)+w'×r+2·w×r', Equation (3) is further represented as follows:

$$a12y=a1y-a2y=+(wx\ wy+wz')(r1x-r2x)+2wz(r1x'-r2x')=+(wx\ wy+wz')(2dx)+2wz(2x').$$

Similarly, Equation (4) is further represented as follows:

$$a12z=a1z-a2z=+(wx\ wz-wy')(r1x-r2x)-2wy(r1x'-r2x')=+(wx\ wz-wy')(2dx)-2wy(2x')wy.$$

Similarly, Equation (5) is further represented as follows:

$$a34x=a3x-a4x=+(wx\ wy-wz')(r3y-r4y)-2wz(r3y'-r4y')=+(wx\ wy-wz')(2dy)-2wz(2y').$$

Similarly, Equation (6) is further represented as follows:

$$a34z=a3z-a4z=+(wy\ wz+wx')(r3y-r4y)+2wx(r3y'-r4y')=+(wy\ wz+wx')(2dy)+2wx(2y')wx.$$

That is, as shown, the wz component in Equation (3), the wy component in Equation (4), the wz component in Equation (5), and the wx component in Equation (6) are the terms of interests, the angular velocity to be measured.

The temporal differential sensing, on the other hand, resolves such issues in a MEMS gyroscope. For instance, consider two elements vibrating along an x-axis. By applying temporal differential sensing, measurements from the same sensing elements (e.g., masses) taken at time t1 and time t2 can be subtracted, where at time t1, the motion is max in one direction (x' and y' max and positive) and where at time t2, the motion is max in opposite direction (x' and y' same max, but negative).

In one or more embodiments, temporal difference can be computed in the MEMS gyroscope before or after spatial difference.

In some embodiments, only the temporal differential sensing method may be utilized in the MEMS gyroscope. However, in other embodiments, the temporal differential sensing method may be utilized in conjunction with the spatial differential sensing method.

An example of applying temporal difference sensing before spatial difference sensing is described with respect to the wy component related to a1z and a2z above (see Equation (4)).

Equation (4) may be represented as Equation (4') as follows:

$$a1z(t1)-a1z(t2)=(1z-1z)+(wx\ wz-wy')(r1x-r1x)+(wy\ wz+wx')(r1y-r1y)-(wx^2+wy^2)(r1z-r1z)-2wy(x'+x').$$

Equation (4') can be further simplified as follows:

$$a1z(t1)-a1z(t2)=0+(wx\ wz-wy')2(x)+(wy\ wz+wx')\cdot 0+(wx^2+wy^2)\cdot 0+-2wy(2x').$$

As shown from Equation (4'), x=0 when x' is at peak. Accordingly, all unwanted terms previously shown in the spatial differential sensing method are cancelled perfectly. Here, however, this assumption and calculation are based on only if angular velocity and its derivative do not change between time t1 and time t2. If time t1 and time t2 are sampled to be sufficiently close together in time such that angular velocity and its derivative do not change between time t1 and time t2, a1z(t1)−a1z(t2) can be further simplified as Equation (4″) as follows:

$$a1zt12=a1z(t1)-a1z(t2)=-2wy(2x'), a2zt12=a2z(t1)-a2z(t2)=-2wy(-2x')$$

Here, a2z is the same as a1z but they are opposite in motion.

Further, a1zt12−a2zt12 can be calculated in a similar manner. That is, a1zt12−a2zt12=−2 wy (4 x')=−8 wy x'.

An example of applying temporal difference sensing after spatial difference sensing is described with respect to the wy component related to a12z above (see Equation (4)).

Equation (4) may be represented as Equation (4‴) as follows:

$$a12z(t1)=+(wx\ wz-wy')(t1)2(dx+x(t1))-2wy(2x'(t1)),$$
where $x'(t1)=x'$ max value and positive, and $x(t1)=0$ $$a12z(t2)=+(wx\ wz-wy')(t2)2(dx+x(t2))-2wy(2x'(t2)),$$
where $x'(t2)=-x'$, here same max value but negative, and $x(t2)=0$ Equation (4‴) can be further simplified as follows:

$$a12z(t1)-a12z(t2)=0+-4wy(2x')=-8wy\ x'.$$

As shown, the a12z(t1)−a12z(t2) value (i.e., −8 wy x' value) is the same for applying temporal difference sensing before spatial difference sensing and for applying temporal difference sensing after spatial difference sensing.

That is, regardless of when the temporal differential sensing method is applied (either before or after applying spatial differential sensing), the unwanted terms due to Centrifugal force (wx wy and wx wz) and Euler force (wz' and wy') cancel perfectly, if angular velocity and its derivative do not change between time t1 and time t2. This can be achieved when time t1 and time t2 are close together. Namely, it is likely that angular velocity and its derivative do not change when time t1 and t2 are sufficiently close together, and from an application standpoint, this can be achieved by employing high sampling speed (that way, time t1 and time t2 are sufficiently close to each other in time).

Because the residual unwanted terms are completely canceled out, the need for reducing the dx or dy distance between sensing elements (e.g., proof mass) to minimize the residual unwanted terms is unnecessary. On the other hand, the wanted terms proportional to Coriolis force are the only term left of the sensing element, which is the wx, wy, and wz components. As shown in Equation (4″) or Equation (4‴), the component left after cancellation is −8 wy x' that includes the wy component of interest.

The temporal differential sensing method and the MEMS gyroscope incorporating the same addresses the problem associated with the Centrifugal force (wx wy and wx wz) and Euler force (wz' and wy') when only the spatial differential sensing method is applied. One technical advantages of utilizing the temporal differential sensing method is that it reduces power consumption. Reducing power consumption in a MEMS gyroscope also provides, in turn, a longer life cycle of the MEMS gyroscope.

An optimal design of a vibrating structure gyroscope minimizes dx and maximizes x' component. Further, the best signal to noise ratio (SNR) is obtained by sampling when abs(x') and abs(y') are at peak. However, the spatial differential sensing method utilized in the related art cannot cure the deficiencies within its method due to the fact that it cannot cancel out the residual unwanted terms due to Centrifugal force (wx wy and wx wz) and Euler force (wz' and wy').

The present disclosure is not limited to situations where the angular velocity and its derivative do not change between times t1 and t2.

In case the angular velocity and its derivative do change between times t1 and t2, the aforementioned equations can be represented as follows:

First of all, a1z component can be represented as:

$$a1z=1z-(wx\ wz-wy')(rx+dx+x)+(wy\ wz+wx')(ry)-(wx^{-2}+wy^{-2})(rz)-(2wy)(x')$$

Based on this equation a1z(t1) and a1z(t2) can be represented as:

$$a1z(t1)=1z-(wx\ wz-wy')(rx+dx+x)+(wy\ wz+wx')(ry)-(wx^{-2}+wy^{-2})(rz)-(2wy)(x'),\ w\ \text{and}\ w'\ \text{at}\ t1.$$

$$a1z(t2)=1z-(wx\ wz-wy')(rx+dx-x)+(wy\ wz+wx')(ry)-(wx^{-2}+wy^{-2})(rz)-(2wy)(-x'),\ w\ \text{and}\ w'\ \text{at}\ t2.$$

Here, wx(t1)~=wx(t2) and wx(t2)=wx(t1)+wx'(t1) (t2−t1) =wx+wx' dt.

This is the same for the wy and wz components.

Also, wx'(t1)~=wx'(t2) and wx'(t2)=wx'(t1)+wx''(t1) (t2−t1)=wx'+wx'' dt.

This is the same for the wy' and wz' components.

Here, time interval dt is defined as: dt=t2−t1 and terms proportional to dt^2 are smaller and can be neglected. The error term is then defined as wx' dt and wx'' dt respectively, and similarly for the other components.

Here, wx^2(t2) can be represented as: wx^2(t2)=wx^2+2 wx wx' dt+(wx' dt)^2. The second order term proportional to dt^2 can be neglected because much smaller than dt. The error term is then defined as 2 wx wx' dt, and similarly for the other components.

This is the same for the wy^2 and wz^2 components.

Here, wx(t2) wy(t2) can be represented as:

$$wx(t2)wy(t2)=wx\ wy+(wx\ wy'+wy\ wx')dt+(wx'wy')dt^{\wedge}2.$$

This is the same for wy wz component and the wx wz component. The second order term proportional to dt^2 can be neglected because much smaller than dt. The error term is then defined as (wx wy'+wy wx') dt, and similarly for the other components.

Taking this into consideration, the equations for a1z(t1) and a1z(t2) can be simplified as follows:

$$a1z(t1)=1z-(wx\ wz-wy')(rx+dx+x)+(wy\ wz+wx')(ry)-(wx^{\wedge}2+wy^{\wedge}2)(rz)-(2wy)(x');\ \text{and}$$

$$a1z(t2)=1z-(wx\ wz-wy'+\text{error terms})(rx+dx-x)+(wy\ wz+wx'+\text{error terms})(ry)-(wx^{\wedge}2+wy^{\wedge}2+\text{error terms})(rz)-(2wy)(-x').$$

Accordingly, a1z(t1)−a1z(t2) can be simplified as follows assuming x=0 because sampling happens when x' is maximum:

$$a1z(t1)-a1z(t2)=-(err)(rx+dx)+(err)(ry)+-(err)(rz)-4wy(2x').$$

Based on the calculation above and considering that x=0 when x' at peak, and dx is small by design, and rx can be large depending on the gyroscope position, and the err term is small or closer to 0, the error terms on the non-oscillating axis can be cancelled by spatial differential sensing, which leaves only one residual term, the −(err) (2 dx) component.

Here, the effect of the err term is small but the multiplication by the rotation radius rx, ry, rz has to be considered. Also, the err term is close to 0 if rotation radius is close to 0 or both w and w' are constant (w' and w"=0). That is, in some embodiments, the spatial differential sensing may be used in combination with the temporal differential sensing method to improve the operations of the MEMS gyroscope.

As previously described, in a temporal differential sensing method, signals are sampled at peak absolute velocity and opposite sign (e.g., sampling at time t1 and time t2). This method is beneficial in that it can be applied in both situations where the angular velocity and its derivative do not change between times t1 and t2, as well as where the angular velocity and its derivative change between times t1 and t2.

If angular velocity and acceleration (i.e., its derivative) stay constant (e.g., do not change), the cancellation of residual error terms due to Euler and Centrifugal force is perfect. That is, the temporal differential sensing method can completely cancel the error terms due to Euler and Centrifugal force and leave only the terms related to Coriolis force.

On the other hand, even if angular velocity and acceleration (i.e., its derivative) do not stay constant and change, the temporal differential sensing method may not completely cancel the error terms due to Euler and Centrifugal force. However, the temporal differential sensing method still produces a better result compared to the spatial differential sensing because the residual error term is proportional to the first derivative squared and the second derivative rather than the angular velocity squared and the first derivative. Namely, because signals are sampled when velocity is equal and opposite, error terms have opposite signals and cancels themselves out during summation. The delay process using time delay circuitry and the adding process using adding circuitry can be implemented in the analog domain or digital domain. The aforementioned features of the temporal differential sensing method can be further explained in conjunction with FIG. 3.

Figure 3:
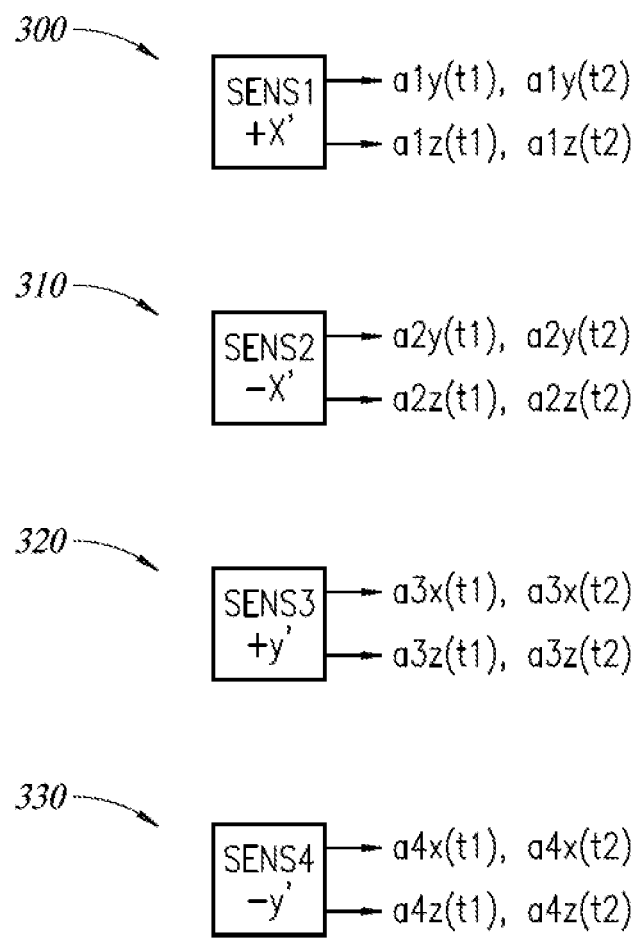
FIG. 3 is a diagram of acceleration force involved at sampling times t1 and t2 of each mass.

FIG. 3 is a diagram of acceleration force involved at sampling times t1 and t2 of each mass.

Block 300 or sensing block 300 describes the acceleration force sensed at SENS1 with respect to mass 1 and the relevant acceleration components with respect to the various axes. Block 310 or sensing block 310 describes the acceleration force sensed at SENS2 with respect to mass 2 and the relevant acceleration components with respect to the various axes. Block 320 or sensing block 320 describes the acceleration force sensed at SENS3 with respect to mass 3 and the relevant acceleration components with respect to the various axes. Block 330 or sensing block 330 describes the acceleration force sensed at SENS4 with respect to mass 4 and the relevant acceleration components with respect to the various axes.

In block 300, components a1y(t1), a1y(t2), a1z(t1), and a1z(t2) are involved and a1y and a1z can be calculated as follows:

$$a1y = 1y + (wx\ wy + wz')r1x - (wx^2 + wz^2)r1y + (wy\ wz - wx')r1z + 2wz r1x'$$

$$a1z = 1z + (wx\ wz - wy')r1x + (wy\ wz + wx')r1y - (wx^2 + wy^2)r1z - 2wy r1x'$$

Here, $x'(t1) = -x'(t2)$ and the cycle may repeat.

In block 310, components a2y(t1), a2y(t2), a2z(t1), and a2z(t2) are involved and a2y and a2z can be calculated as follows:

$$a2y = 1y + (wx\ wy + wz')r2x - (wx^2 + wz^2)r2y + (wy\ wz - wx')r2z - 2wz\ r2x'$$

$$a2z = 1z + (wx\ wz - wy')r2x + (wy\ wz + wx')r2y - (wx^2 + wy^2)r2z + 2wy\ r2x'$$

In block 320, components a3x(t1), a3x(t2), a3z(t1), and a3z(t2) are involved and a3x and a3z can be calculated as follows:

$$a3x = 1x - (wy^2 + wz^2)r3x + (wx\ wy - wz')r3y + (wx\ wz + wy')r3z - 2wz\ r3y'$$

$$a3z = 1z + (wx\ wz - wy')r3x + (wy\ wz + wx')r3y - (wx^2 + wy^2)r3z + 2wx\ r3y'$$

Here, $y'(t1) = -y'(t2)$ and the cycle may repeat.

In block 330, components a4x(t1), a4x(t2), a4z(t1), and a4z(t2) are involved and a4x and a4z can be calculated as follows:

$$a4x = 1x - (wy^2 + wz^2)r4x + (wx\ wy - wz')r4y + (wx\ wz + wy')r4z + 2wz\ r4y'$$

$$a4z = 1z + (wx\ wz - wy')r4x + (wy\ wz + wx')r4y - (wx^2 + wy^2)r4z - 2wx\ r4y'$$

The calculated blocks above are arranged for implementing a combination of temporal differential sensing and spatial differential sensing in a MEMS gyroscope, which is explained in connection with the embodiments shown in FIGS. 4A, 4B, 4C, and 4D.

Figure 4A:
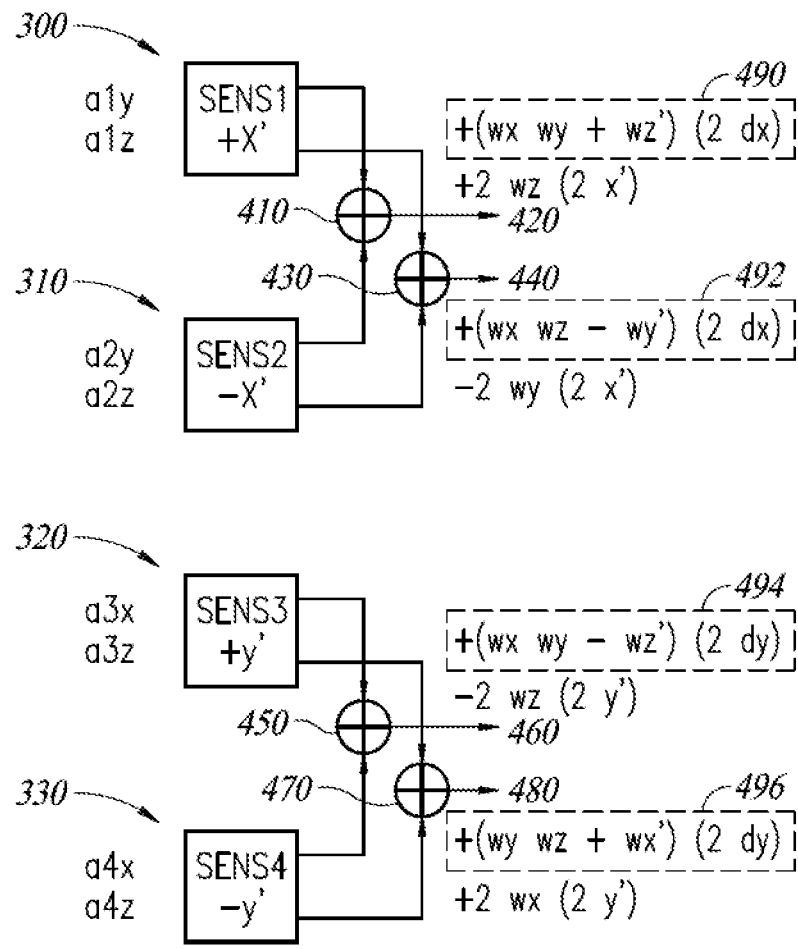
FIG. 4A is a schematic logic block diagram of a spatial differential sensing method according to the mass shown in FIGS. 2A, 2B and the sensing blocks of FIG. 3.

FIG. 4A is a schematic logic block diagram of a spatial differential sensing method according to the mass shown in FIGS. 2A, 2B and the sensing blocks of FIG. 3.

As shown, a sensing block 300 (SENS1+x') and a sensing block 310 (SENS2−x') are added together using an adder 410 (or an adding circuitry 410) to produce output 420.

Referring to FIG. 3 and the calculation obtained with respect to sensing block 300 and sensing block 310, adding the a1y component of the sensing block 300 and the a2y component of the sensing block 310 at the adder 410 results in the following output 420: +(wx wy+wz') (2 dx)+2 wz(2 x').

Among the output 420 of +(wx wy+wz') (2 dx)+2 wz(2 x'), a portion 490 of the output 420, which is +(wx wy+wz') (2 dx), includes the unwanted error term due to the Centrifugal force (wx wy and wx wz) and Euler force (wz' and wy').

Similarly, adding the a1z component of the sensing block 300 and the a2z component of the sensing block 310 at the adder 430 results in the following output 440: +(wx wz−wy') (2 dx)−2 wy(2 x').

Among the output 440 of +(wx wz−wy') (2 dx)−2 wy(2 x'), a portion 492 of the output 440, which is +(wx wz−wy') (2 dx), includes the unwanted error term due to the Centrifugal force (wx wy and wx wz) and Euler force (wz' and wy').

Respect to the other components, adding the a3x component of the sensing block 320 and the a4x component of the sensing block 330 at the adder 450 results in the following output 460: +(wx wy−wz') (2 dy)−2 wz(2 y').

Among the output 460 of +(wx wy−wz') (2 dy)−2 wz(2 y'), a portion 494 of the output 460, which is +(wx wy−wz') (2 dy), includes the unwanted error term due to the Centrifugal force (wx wy and wx wz) and Euler force (wz' and wy').

Similarly, adding the a3z component of the sensing block 320 and the a4z component of the sensing block 330 at the adder 470 results in the following output 480: +(wy wz+wx') (2 dy)+2 wx(2 y').

Among the output 480 of +(wy wz+wx') (2 dy)+2 wx(2 y'), a portion 496 of the output 480, which is +(wy wz+wx') (2 dy), includes the unwanted error term due to the Centrifugal force (wx wy and wx wz) and Euler force (wz' and wy').

As described from the logic block diagram, applying only a spatial differential sensing method in a MEMS gyroscope produces wanted terms associated with the Coriolis force (e.g., Coriolis force can be maximized by increasing x' or y' velocity of the sensing element), but also produces unwanted error terms due to Centrifugal force (wx wy and wx wz) and Euler force (wz' and wy'). These unwanted error terms do not cancel out by applying only the spatial differential sensing method in a MEMS gyroscope.

Figure 4B:
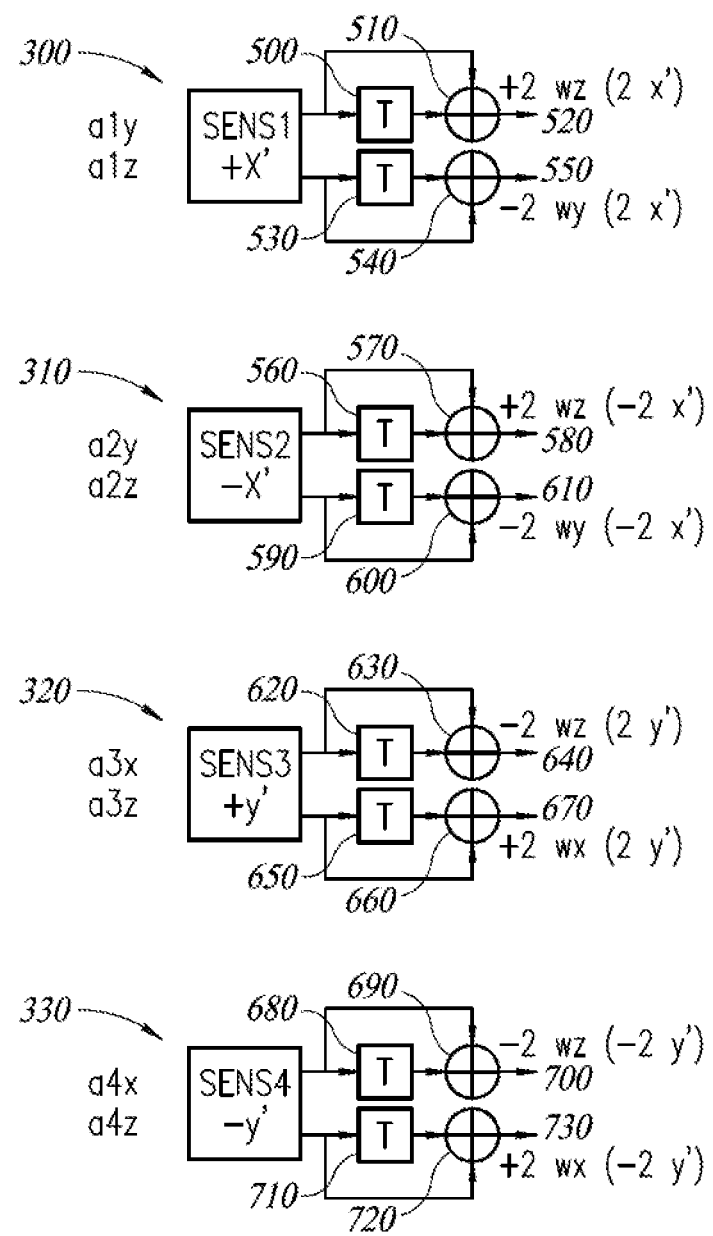
FIG. 4B is a schematic logic block diagram of a temporal differential sensing method according to the mass shown in FIGS. 2A, 2B and the sensing blocks of FIG. 3.
Figure 4C:
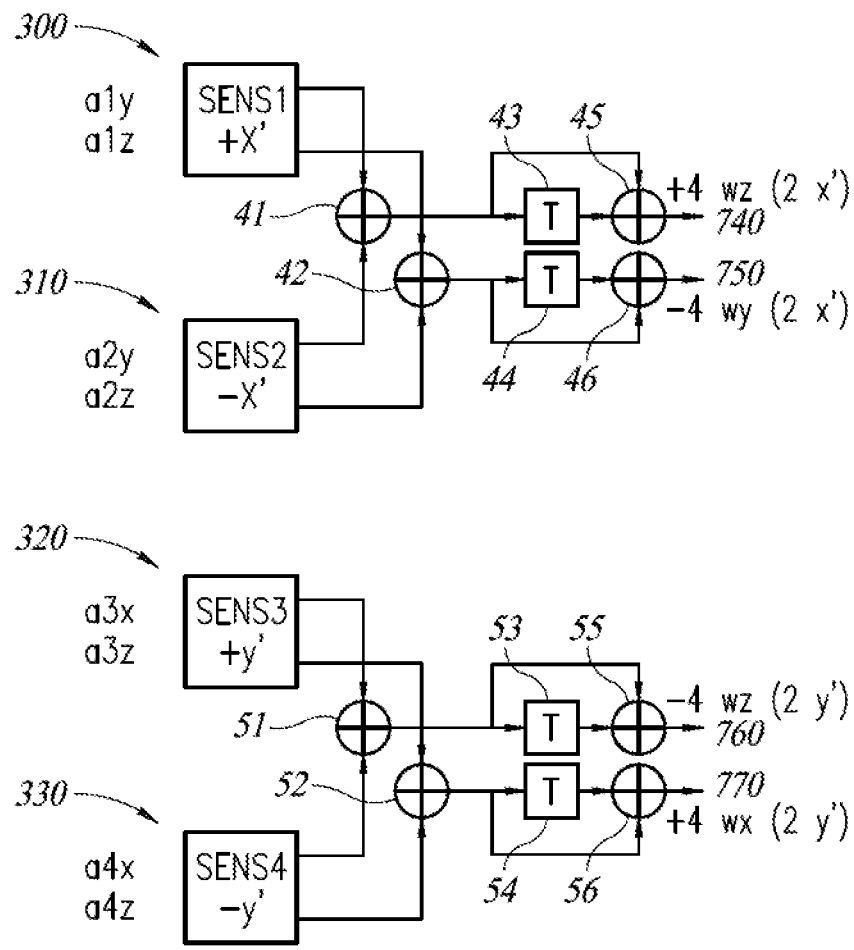
FIG. 4C is a schematic logic block diagram of a combination of a temporal differential sensing method and a spatial differential sensing method according to the mass shown in FIGS. 2A, 2B and the sensing blocks of FIG. 3.
Figure 4D:
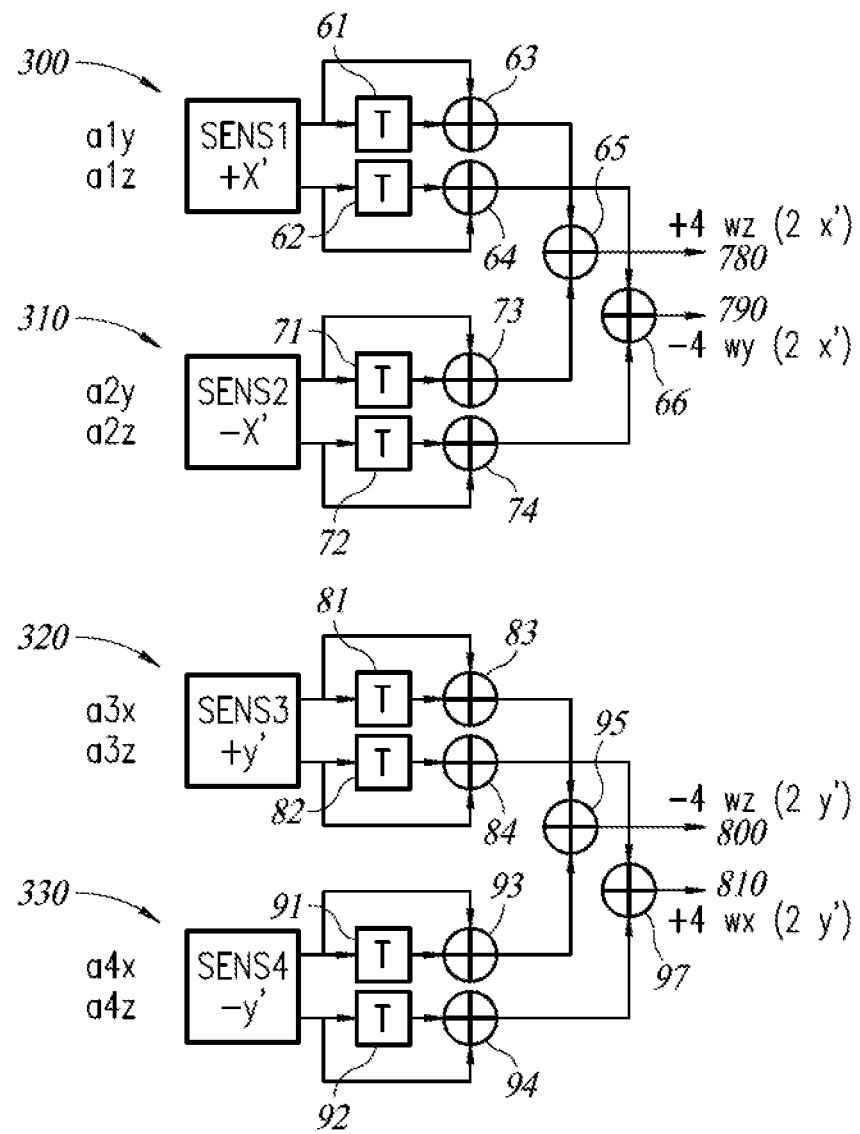
FIG. 4D is a schematic logic block diagram of a combination of a spatial differential sensing method and a temporal differential sensing method according to the mass shown in FIGS. 2A, 2B and the sensing blocks of FIG. 3.

FIGS. 4B, 4C, and 4D illustrate logic block diagrams combining both the spatial differential sensing and the temporal differential sensing method in a MEMS gyroscope.

FIG. 4B is a schematic logic block diagram of a temporal differential sensing method according to the mass shown in FIGS. 2A, 2B and the sensing blocks of FIG. 3.

FIG. 4B is one embodiment that can cancel out the unwanted error terms that are generally present when only applying a temporal differential sensing method.

Here, the a1y component of sensing block 300 is provided to a time delay element T 500 (or a time delay circuitry T). The time delay element T delays the time for time T=t2−t1. The time delayed component of a1y component of the sensing block 300 is added through an adder 510 with the a1y component of the sensing block 300. This results in the following output 520: +2 wz(2 x').

Note that the output 520 of +2 wz(2 x') does not include any unwanted error term due to the Centrifugal force (wx wy and wx wz) and Euler force (wz' and wy'). That is, the output 520 includes only the wanted terms associated with the Coriolis force (e.g., x' or y' component).

In one or more embodiments, the delay and add can be implemented in the analog or digital domain.

Similarly, the a1z component of the sensing block 300 is provided to a time delay element T 530. The time delay element T delays the time for time T=t2−t1. The time delay element described in conjunction with FIGS. 4B, 4C, and 4D are all time delayed by time T=t2−t1. The time delayed component of a1z component of the sensing block 300 is added through an adder 540 with the a1z component of the sensing block 300. This results in the following output 550: −2 wy(2 x').

Note that the output 550 of −2 wy(2 x') does not include any unwanted error term due to the Centrifugal force (wx wy and wx wz) and Euler force (wz' and wy'). That is, the output 550 includes only the wanted terms associated with the Coriolis force (e.g., x' or y' component).

Similar calculations can be performed with respect to the other sensing blocks 310, 320, 330.

Again, the a2y component of the sensing block 310 is provided to a time delay element T 560. The time delayed component of a2y component of the sensing block 310 is added through an adder 570 with the a2y component of the sensing block 310. This results in the following output 580: +2 wz(−2 x').

Note that the output 580 of +2 wz(−2 x') does not include any unwanted error term due to the Centrifugal force (wx wy and wx wz) and Euler force (wz' and wy'). That is, the output 580 includes only the wanted terms associated with the Coriolis force (e.g., x' or y' component).

Similarly, the a2z component of the sensing block 310 is provided to a time delay element T 590. The time delayed component of a2z component of the sensing block 310 is added through an adder 600 with the a2z component of the sensing block 310. This results in the following output 610: −2wy(−2 x').

Note that the output 610 of −2wy(−2 x') does not include any unwanted error term due to the Centrifugal force (wx wy and wx wz) and Euler force (wz' and wy').

With respect to the sensing block 320, the a3x component of the sensing block 320 is provided to a time delay element T 620. The time delayed component of a3x component of the sensing block 320 is added through an adder 630 with the a3x component of the sensing block 320. This results in the following output 640: −2 wz(2 y').

Note that the output 640 of −2 wz(2 y') does not include any unwanted error term due to the Centrifugal force (wx wy and wx wz) and Euler force (wz' and wy'). That is, the output 640 includes only the wanted terms associated with the Coriolis force (e.g., x' or y' component).

Similarly, the a3z component of the sensing block 320 is provided to a time delay element T 650. The time delayed component of a3z component of the sensing block 320 is added through an adder 660 with the a3z component of the sensing block 320. This results in the following output 670: +2 wx(2 y').

Note that the output 670 of +2 wx(2 y') does not include any unwanted error term due to the Centrifugal force (wx wy and wx wz) and Euler force (wz' and wy').

With respect to the sensing block 330, the a4x component of the sensing block 330 is provided to a time delay element T 680. The time delayed component of a4x component of the sensing block 330 is added through an adder 690 with the a4x component of the sensing block 330. This results in the following output 700: −2 wz(−2 y').

Note that the output 700 of −2 wz(−2 y') does not include any unwanted error term due to the Centrifugal force (wx wy and wx wz) and Euler force (wz' and wy'). That is, the output 700 includes only the wanted terms associated with the Coriolis force (e.g., x' or y' component).

Similarly, the a4z component of the sensing block 330 is provided to a time delay element T 710. The time delayed component of a4z component of the sensing block 330 is added through an adder 720 with the a4z component of the sensing block 330. This results in the following output 730: +2 wx(−2 y').

Note that the output 730 of +2 wx(−2 y') does not include any unwanted error term due to the Centrifugal force (wx wy and wx wz) and Euler force (wz' and wy').

As described from the logic block diagram, applying only a temporal differential sensing method in a MEMS gyroscope without the use of a spatial differential sensing method can eliminate unwanted terms when w and w' are constant. These unwanted error terms cancel out by the use of specific configurations of the temporal differential sensing using the time delay circuitry T and the adding circuitry.

The embodiment of FIG. 4B employing only the temporal differential sensing method includes zero error terms if w' and w do not change between time t1 and t2.

However, if they change, three smaller error terms proportional to w', w''' and (w*w') and proportional to the constant/common term of the rotation radius is introduced (x). Here, gain compensation is not required because the signal comes from the same element and there may be additional latency.

However, such error terms are still minimal compared to the error terms caused by the spatial differential sensing method described in conjunction with FIG. 4A. That is, in the embodiment of FIG. 4A employing only the spatial differential sensing method includes one residual error term proportional to Euler (w') or Centrifugal (w*w) force and proportional to distance between sensing elements (dx). However, here, gain compensation may be required because signals come from different elements, and is greater than the error term introduced by temporal differential sensing when w' and w do change between time t1 and t2.

FIG. 4C is a schematic logic block diagram of a combination of a temporal differential sensing method and a spatial differential sensing method according to the mass shown in FIGS. 2A, 2B and the sensing blocks of FIG. 3.

In this embodiment, the logic block diagram shows that the spatial differential sensing method is applied first and then the temporal differential sensing method is applied.

Here, the a1y component of the sensing block 300 and the a2y component of the sensing block 310 is added at an adder 41. The added output (i.e., a first output) is provided to a time delay element T 43 to provide a time delayed output (i.e., a second output). The first output and the second output are added at an adder 45 to produce output 740: +4wz (2 x').

As shown, output 740 does not include any error terms due to the Centrifugal force (wx wy and wx wz components) and Euler force (wz' and wy' components). It only includes the components based on the Coriolis force (x' and y' components).

Similarly, the a1z component of the sensing block 300 and the a2z component of the sensing block 310 are added at an adder 42. The added output (i.e., a first output) is provided to a time delay element T 44 to provide a time delayed output (i.e., a second output). The first output and the second output are added at an adder 46 to produce output 750: −4wy (2 x').

With respect to blocks 320, 330, the a3x component of the sensing block 320 and the a4x component of the sensing block 330 are added at an adder 51. The added output (i.e., a first output) is provided to a time delay element T 53 to provide a time delayed output (i.e., a second output). The first output and the second output are added at an adder 55 to produce output 760: −4wz (2 y').

Similarly, the a3z component of the sensing block 320 and the a4z component of the sensing block 330 are added at an adder 52. The added output (i.e., a first output) is provided to a time delay element T 54 to provide a time delayed output (i.e., a second output). The first output and the second output are added at an adder 56 to produce output 770: +4wx (2 y').

As shown, outputs 750, 760, 770 only include the components based on the Coriolis force (x' and y' components).

As described from the logic block diagram, applying the spatial different sensing method and the temporal differential sensing method together in a MEMS gyroscope produces wanted terms associated with the Coriolis force (e.g., Coriolis force can be maximized by increasing x' or y' velocity of the sensing element), but completely cancels out the unwanted error terms due to Centrifugal force (wx wy and wx wz) and Euler force (wz' and wy'). These unwanted error terms do not cancel out by applying only the spatial differential sensing method in a MEMS gyroscope and the proposed embodiment overcomes the shortcomings of the approach in the prior art.

The embodiment of FIG. 4C employing spatial sensing first and applying temporal differential sensing method is, in some aspects, better than the temporal only embodiment of FIG. 4B in that there are either zero error terms or one smaller error term.

FIG. 4D is a schematic logic block diagram of a combination of a spatial differential sensing method and a temporal differential sensing method according to the mass shown in FIGS. 2A, 2B and the sensing blocks of FIG. 3.

In this embodiment, the logic block diagram shows that the temporal different sensing method is applied first and then the spatial differential sensing method is applied.

Here, the a1y component of the sensing block 300 is provided to a time delay element T 61. The time delay element T delays the time for time T=t2−t1. The time delayed component of a1y component of the sensing block 300 is added through an adder 63 with the a1y component of the sensing block 300. This results in a first output of the sensing block 300.

From sensing block 310, the a2y component of the sensing block 310 is provided to a time delay element T 71. The time delayed component of a2y component of the sensing block 310 is added through an adder 73 with the a2y component of the sensing block 310. This results in a second output of the sensing block 310.

Then the first output of the sensing block 300 and the second output of the sensing block 310 is added at adder 65 to produce output 780: +4wz (2x').

Similarly, the a1z component of the sensing block 300 is provided to a time delay element T 62. The time delayed component of a1z component of the sensing block 300 is added through an adder 64 with the a1z component of the sensing block 300. This results in a third output of the sensing block 300.

From sensing block 310, the a2z component of the sensing block 310 is provided to a time delay element T 72. The time delayed component of a2z component of the sensing block 310 is added through an adder 74 with the a2z component of the sensing block 310. This results in a fourth output of the sensing block 310.

Then the third output of the sensing block 300 and the fourth output of the sensing block 310 are added at adder 66 to produce output 790: −4wy (2x').

With respect to blocks 320, 330, the a3x component of the sensing block 320 is provided to a time delay element T 81. The time delayed component of a3x component of the sensing block 320 is added through an adder 83 with the a3x component of the sensing block 320. This results in a first output of the sensing block 320.

From sensing block 330, the a4x component of the sensing block 330 is provided to a time delay element T 91. The time delayed component of the a4x component of the sensing block 330 is added through an adder 93 with the a4x component of the sensing block 330. This results in a second output of the sensing block 330.

Then the first output of the sensing block 320 and the second output of the sensing block 330 are added at adder 95 to produce output 800: −4wz (2y').

Similarly, the a3z component of the sensing block 320 is provided to a time delay element T 82. The time delayed component of a3z component of the sensing block 320 is added through an adder 84 with the a3z component of the sensing block 320. This results in a third output of the sensing block 320.

From sensing block 330, the a4z component of the sensing block 330 is provided to a time delay element T 92. The time delayed component of a4z component of the sensing block 330 is added through an adder 94 with the a4z component of the sensing block 330. This results in a fourth output of the sensing block 330.

Then the third output of the sensing block 320 and the fourth output of the sensing block 330 are added at adder 97 to produce output 810: +4wx (2y').

As shown from outputs 780, 790, 800, 810, these outputs only includes the components based on the Coriolis force (x' and y' components).

As described from the logic block diagram, applying the temporal differential sensing method and the spatial differential sensing method together in a MEMS gyroscope produces wanted terms associated with the Coriolis force (e.g., Coriolis force can be maximized by increasing x' or y' velocity of the sensing element), but completely cancels out the unwanted error terms due to Centrifugal force (wx wy and wx wz) and Euler force (wz' and wy').

The embodiment of FIG. 4D employing temporal sensing first and applying spatial differential sensing method is, in some aspects, equivalent to the embodiment of FIG. 4C, but more adders or adding circuitry are needed according to the embodiment of FIG. 4D.

The configurations of combining the temporal differential sensing method with the spatial differential sensing method to cancel out the unwanted error terms may be done in many ways and FIGS. 4C and 4D provides one example of doing so. A person of ordinary skill in the art would readily appreciate various combinations can be made based on what is disclosed herein.

Figure 5:
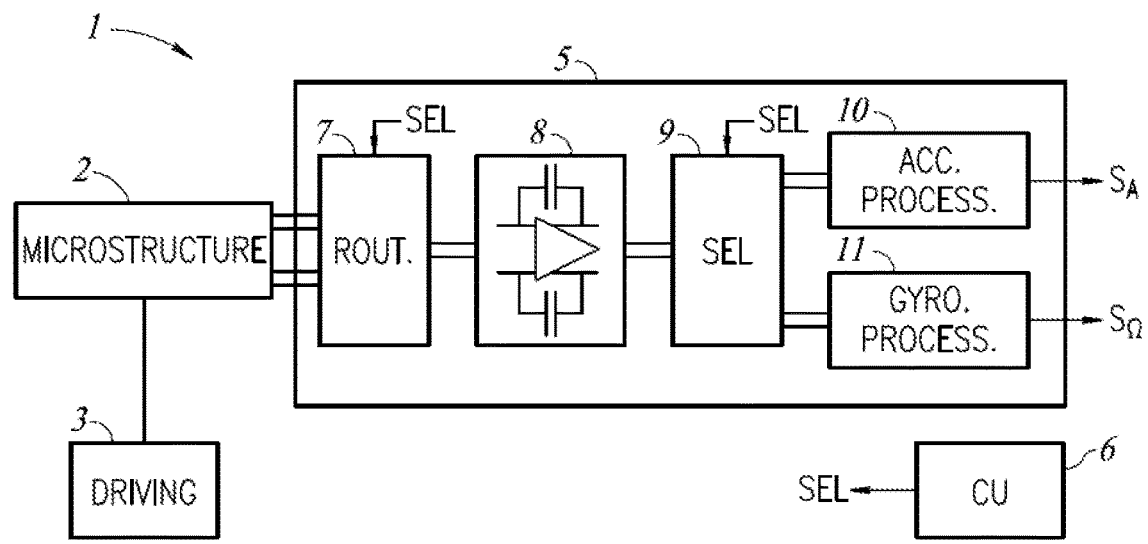
FIG. 5 is a simplified block diagram of a microelectromechanical device according to one embodiment of the present disclosure.

FIG. 5 is a simplified block diagram of a microelectromechanical device according to one embodiment of the present disclosure.

With reference to FIG. 5, a microelectromechanical device 1 integrating the functions of accelerometer and gyroscope comprises a microstructure 2, a driving device 3, a read device 5, and a control unit 6. The microstructure 2 or MEMS 2 can be implemented according to the MEMS gyroscope described in connection with the figures including FIGS. 4B, 4C, and 4D.

As will be explained hereinafter, the microstructure 2 comprises moving elements, which are kept in controlled vibrational motion by the driving device 3 and enable sensing of accelerations and rotations of the microstructure 2 according to a first sensing axis and to a second sensing axis, respectively.

Here and in what follows, the expression "according to an axis" will be used to indicate movements along an axis or about an axis, according to whether the movements allowed for the masses by the respective degrees of freedom are translational or else rotational, respectively.

Likewise, the expression "according to a degree of freedom" will be used to indicate translational or rotational movements, as allowed by the degree of freedom itself.

The microstructure 2 further supplies to the read device 5 sensing signals that are processed to obtain acceleration signals $S_A$ and rotation signals $S_\Omega$. The sensing signals, which in one embodiment are differential charge packets, indicate, respectively, accelerations of the microstructure 2 along the first sensing axis and rotations of the microstructure 2 about the second sensing axis.

The read device 5 is configured to obtain the acceleration signals $S_A$ and the rotation signals $S_\Omega$ from the sensing signals supplied by the microstructure 2, using respectively a first processing mode and a second processing mode, and is controlled for this purpose by the control unit 6.

In one non-limiting embodiment, the read device comprises a routing stage 7, a sensing interface 8, which in one embodiment is a fully differential switched-capacitor charge amplifier, a selector 9, an acceleration-processing chain 10, and a rotation-processing chain 11.

The routing stage 7 couples the microstructure 2 to input terminals of the sensing interface 8 and establishes respective distinct modalities of coupling in the first processing mode and in the second processing mode. The modalities of coupling can be selected by the control unit 6, for example through a selection signal SEL.

The sensing interface 8 combines the sensing signals received from the microstructure 2 into transduction signals, which, through the selector 9, are supplied to the acceleration-processing chain in the first processing mode, and to the rotation-processing chain 11, in the second processing mode. Also the selector 9 can be controlled through the selection signal SEL.

The acceleration-processing chain 10 and the rotation-processing chain 11 are configured to extract, respectively, the acceleration signals $S_A$ and the rotation signals $S_\Omega$ from the signals received from the sensing interface 8 in a way in itself known.

The control unit 6 selects cyclically the first processing mode and the second processing mode so that updated values of the acceleration signals $S_A$ and the rotation signals $S_\Omega$ will be constantly available. Alternatively, the control unit 6 can receive an external command that determines the processing mode according to the need.

Figure 6:
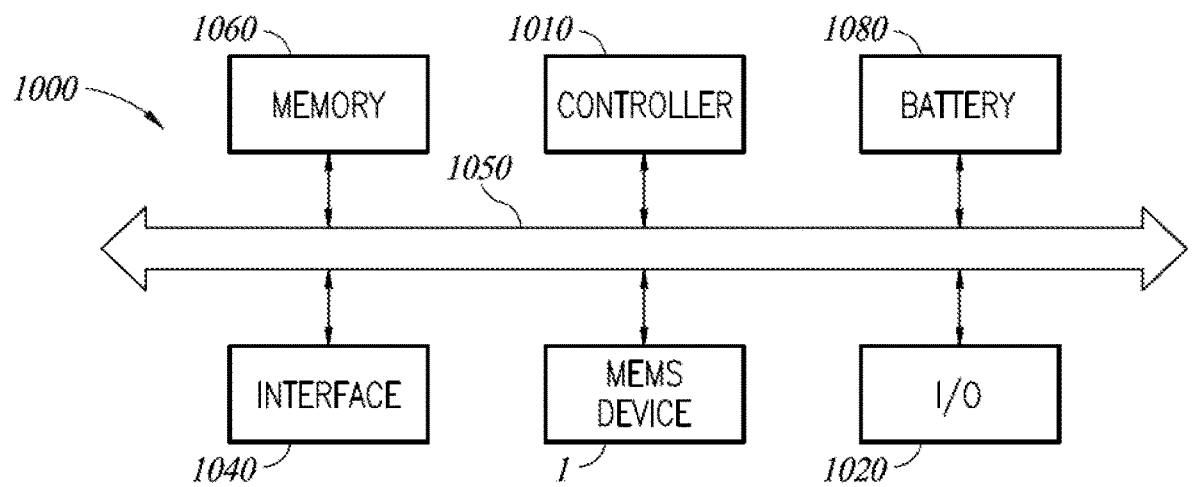
FIG. 6 illustrates a portion of an electronic system according to an embodiment of the present disclosure.

FIG. 6 illustrates a portion of an electronic system 1000 according to an embodiment of the present disclosure. The system 1000 incorporates the microelectromechanical device 1 and can be used in electronic systems, such as, for example, a palmtop computer (personal digital assistant, PDA), a portable computer, possibly with wireless capacity, a cell phone, a messaging device, a digital audio player, a digital photographic camera or video camera, an inertial navigation system, an automotive system, or other devices designed to process, store, transmit or receive information. For example, the microelectromechanical device 1 can be used in a digital camera for sensing movements and carry out an image stabilization. In a further embodiment, the microelectromechanical device 1 is included in a user interface activated by motion for computers or consoles for videogames. In a further embodiment, the microelectromechanical device 1 is incorporated in a satellite navigation device and is used for temporary tracking of position in the case of loss of the satellite positioning signal.

The electronic system 1000 can comprise a controller 1010, an input/output (I/O) device 1020 (for example, a keyboard or a display), the microelectromechanical device 1, a wireless interface 1040, and a memory 1060, of a volatile or nonvolatile type, which are coupled together through a bus 1050. In one embodiment, a battery 1080 can be used for supplying the system 1000. It should be noted that the scope of the present disclosure is not limited to embodiments having necessarily one or all of the devices listed.

The controller 1010 can comprise, for example, one or more microprocessors, microcontrollers, and the like.

The I/O device 1020 can be used for generating a message. The system 1000 can use the wireless interface 1040 to transmit and receive messages to and from a wireless communication network with a radiofrequency (RF) signal. Examples of wireless interface can comprise an antenna, a wireless transceiver, such as a dipole antenna, even though the scope of the present disclosure is not limited from this standpoint. Moreover, the I/O device 1020 can supply a voltage representing what is stored either in the form of digital output (if digital information has been stored) or in the form of analog output (if analog information has been stored).

Finally, it is clear that modifications and variations may be made to the device described and illustrated herein, without thereby departing from the sphere of protection of the present disclosure.

In particular, the possibility of integrating the functions of accelerometer and gyroscope is not limited to just the configurations of microstructure described, but can be advantageously exploited with any microstructure having pairs of movable masses in phase opposition.

In order to reduce any risk of errors due to spurious mechanical couplings, it is hence possible to use, instead of each individual sensing mass, systems of a number of masses with an auxiliary mass for driving and a movable mass with a degree of freedom with respect to the driving mass.

In addition, a number of reading chains can be clearly used, possibly connected in a permanent way to the microstructure, instead of a single chain connected in time division to the various terminals.

One or more embodiments of the present disclosure provides a device (e.g., a MEMS vibrating gyroscope). The device utilizes a temporal differential sensing method either alone or in combination with a spatial differential sensing method that enables rejection of error terms due to Euler and Centrifugal force.

The vibrating proof mass in gyroscopes is not only subject to the Acceleration force but also to Euler, Centrifugal, and Coriolis force. The Coriolis force is proportional to the angular velocity and is therefore a key component. Typically, the device is designed to minimize the measured effect of the Acceleration, Euler, and Centrifugal force while maximizing the effect of the Coriolis force. In the related art, this is achieved by a spatial differential sensing structure where signals coming from two sensing elements moving in opposite directions are subtracted.

However, according to the spatial differential sensing method in the related art, cancellation of Acceleration force is perfect, but cancellation of Euler and Centrifugal force is not. To reduce the sensitivity to Euler and Centrifugal forces, while increasing sensitivity to Coriolis force, the distance between the sensing elements is reduced and their velocity is increased. Further, reducing the size is possible in order to reduce the distance between the sensing elements but this approach increases the cost of the MEMS element. As another approach, increasing the velocity is possible but this approach increases the power consumption and makes the ASIC counterpart more complex and expensive.

In one or more embodiments of the present disclosure, rather than using a spatial processing (e.g., spatial differential sensing method), a temporal approach of making measurement on the same instant for the two masses and combining them is used. In particular, a temporal differential sensing is used where signals are taken at times t1 and t2 when the velocity of the sensing element is maximum and has opposite sign. Put another way, rather than combining the measurement of the two masses, each mass is dealt separately and the measurement generated by the same mass are combined. The temporal approach cancels Euler and Centrifugal forces if in time t1 and in time t2 the angular velocity is constant. Otherwise, if in time t1 and in time t2 the angular velocity is not constant and changed, an error is introduced.

In other embodiments, even if angular velocity is not constant in time t1 and t2, the temporal approach can be combined with the spatial approach to improve accuracy (see FIGS. 4C and 4D). The technical advantages not only include improving the accuracy of the MEMS device but also reducing power consumption.

In some embodiments, the temporal differential sensing method/processing and the device performing the method include delay elements and adders, in the analog or digital domain, to combine signals with opposite error terms. Delay elements, either analog or digital, enable the composition of signals with opposite error terms which leads to the cancellation of the error terms themselves.

A microelectromechanical device may be summarized as including a first sensing mass and a second sensing mass coupled to an anchor along a first axis, both movable according to the first axis and each movable according to a respective second axis, perpendicular to the first axis; a driving device configured to maintain the first sensing mass and the second sensing mass in oscillation along the first axis in phase opposition; control circuitry coupled to the driving device, the control circuitry configured to: sense a first force information from the first sensing mass, the first force information including information associated with at least one of acceleration force, Centrifugal force, Euler force, or Coriolis force with respect to the first axis, and a second axis perpendicular to the first axis, and a third axis perpendicular to both the first axis and the second axis; output the first force information from the first sensing mass as a first output to a first time delay circuitry; apply time delay to the first output using the first time delay circuitry to generate a second output; and add the first output and the second output using a first adding circuitry coupled to the first time delay circuitry to generate a third output, wherein the third output only includes the first force information associated with the Coriolis force.

The control circuitry may be configured to: sense a second force information from the second sensing mass; output the second force information from the second sensing mass as a fourth output to a second time delay circuitry; apply time delay to the fourth output using the second time delay circuitry to generate a fifth output; and add the fourth output and the fifth output using a second adding circuitry coupled to the second time delay circuitry to generate a sixth output, wherein the sixth output only includes the second force information associated with the Coriolis force.

The control circuitry may be configured to: add the third output and the sixth output using a third adding circuitry coupled to the first adding circuitry and the second adding circuitry to generate an eighth output, wherein the eighth output only includes the first and second force information associated with the Coriolis force.

The first, second, third, and fourth time delay circuits may delay time by a time difference between a first sampling time and a second sampling time, wherein the first sampling time and the second sampling time may be sufficiently close in time so that the Centrifugal force and the Euler force cancel out each other.

A microelectromechanical device may be summarized as including a first sensing mass and a second sensing mass coupled to an anchor along a first axis, both movable according to the first axis and each movable according to a respective second axis, perpendicular to the first axis; a driving device configured to maintain the first sensing mass and the second sensing mass in oscillation along the first axis in phase opposition; control circuitry coupled to the driving device, the control circuitry configured to: sense a first force information from the first sensing mass, the first force information including information associated with at least one of acceleration force, Centrifugal force, Euler force, or Coriolis force with respect to the first axis, a second axis perpendicular to the first axis, and a third axis perpendicular to both the first axis and the second axis; output the first force information from the first sensing mass as a first output; sense a second force information from the second sensing mass, the second force information including information associated with at least one of acceleration force, Centrifugal force, Euler force, or Coriolis force; output the second force information from the second sensing mass as a second output; add the first output and the second output using a first adding circuitry to generate a third output; apply time delay to the third output using a first time delay circuitry to generate a fourth output; and add the third output and the fourth output using a second adding circuitry coupled to the first time delay circuitry to generate a fifth output.

The first time delay circuitry may be coupled between the first adding circuitry and the second adding circuitry.

The first time delay circuitry may apply time delay by a time difference between a first sampling time and a second sampling time, wherein the first sampling time and the second sampling time is sufficiently close in time so that the fifth output does not include components associated with the Centrifugal force and the Euler force.

A method for temporal differential sensing may be summarized as including sensing a first force information from a first mass moving with respect to a first axis, the first force information including information associated with at least one of acceleration force, Centrifugal force, Euler force, or Coriolis force with respect to the first axis, and a second axis orthogonal to the first axis, and a third axis orthogonal to the second axis; outputting the first force information from the first mass as a first output to a first time delay circuitry; applying time delay to the first output using the first time delay circuitry to generate a second output; and adding the first output and the second output using an adding circuitry to generate a third output.

The method may include sensing a second force information from a second mass coupled to the first mass moving with respect to the first axis; outputting the second force information from the second mass as a fourth output to a second time delay circuitry; applying time delay to the fourth output using the second time delay circuitry to generate a fifth output; and adding the fourth output and the fifth output to generate a sixth output.

The method may include sensing a third force information from a third mass moving with respect to the second axis; outputting the third force information from the third mass as a seventh output to a third time delay circuitry; applying time delay to the seventh output using the third time delay circuitry to generate an eighth output; and adding the seventh output and the eighth output to generate a ninth output.

The method may include sensing a fourth force information from a fourth mass coupled to the third mass moving with respect to the second axis; outputting the fourth force information from the fourth mass as a tenth output to a fourth time delay circuitry; applying time delay to the tenth output using the fourth time delay circuitry to generate an eleventh output; and adding the tenth output and the eleventh output to generate a twelfth output.

The first, second, third, and fourth time delay circuit delays time by a time difference between a first sampling time and a second sampling time, wherein the first sampling time and the second sampling time are sufficiently close in time so that the third output only includes the first force information associated with the Coriolis force, the sixth output only includes the second force information associated with the Coriolis force, the ninth output only includes the third force information associated with the Coriolis force, and the twelfth output only includes the fourth force information associated with the Coriolis force.

A method may be summarized as including sensing a first force information from a first sensing mass and a second force information from a second sensing mass, both the first sensing mass and the second sensing mass coupled to each other with respect to a first axis; outputting the first force information from the first sensing mass obtained with respect to a second axis transverse to the first axis to generate a first output; outputting the second force information from the second sensing mass obtained with respect to the second axis to generate a second output; adding the first output and the second output to generate a third output; applying time delay to the third output to generate a fourth output; and adding the third output and the fourth output to generate a fifth output, wherein the fifth output only includes force associated with Coriolis force.

Applying time delay to the third output to generate a fourth output may include delaying by a difference between a second sampling time and a first sampling time.

The method may include outputting the first force information from the first sensing mass obtained with respect to a third axis transverse to both the first axis and the second axis to generate a sixth output; outputting the second force information from the second sensing mass obtained with respect to the third axis and generating a seventh output; adding the sixth output and the seventh output to generate an eighth output; applying time delay to the eighth output to generate a ninth output; and adding the eighth output and the ninth output to generate a tenth output, wherein the tenth output only includes force associated with Coriolis force.

The first sampling time and the second sampling time may be sufficiently close in time and the fifth output and the tenth output may include Coriolis force with respect to the first axis.

A method may be summarized as including sensing a first force information from a first sensing mass moving along a first axis; outputting the first force information from the first sensing mass to generate a first output; applying time delay to the first output to generate a second output; adding the first output and the second output to generate a third output; sensing a second force information from a second sensing mass coupled to the first sensing mass moving along the first axis; outputting the second force information from the second sensing mass to generate a fourth output; applying time delay to the fourth output to generate a fifth output; adding the fourth output and the fifth output to generate a sixth output; and adding the third output and the sixth output to generate seventh output.

Applying time delay may include delaying by a difference between a second sampling time and a first sampling time, wherein the second sampling time and the first sampling time are sufficiently close in time such that the seventh output includes only force associated with Coriolis force.

The method may include sensing a third force information from a third sensing mass moving along a second axis perpendicular to the first axis; outputting the third force information from the third sensing mass to generate an eighth output; applying time delay to the eighth output to generate a ninth output; adding the eighth output and the ninth output to generate a tenth output; sensing a fourth force information from a fourth sensing mass coupled to the third sensing mass moving along the second axis; outputting the fourth force information from the fourth sensing mass to generate an eleventh output; applying time delay to the eleventh output to generate a twelfth output; adding the eleventh output and the twelfth output to generate a thirteenth output; and adding the tenth output and the thirteenth output to generate fifteenth output.

The fifteenth output may include only force associated with Coriolis force.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical device, comprising:
a first sensing mass and a second sensing mass coupled to an anchor along a first axis, both movable according to the first axis and each movable according to a respective second axis, perpendicular to the first axis;
a driving device configured to maintain the first sensing mass and the second sensing mass in oscillation along the first axis in phase opposition; and
control circuitry coupled to the driving device, the control circuitry configured to:
sense a first force information from the first sensing mass, the first force information including information associated with at least one of acceleration force, Centrifugal force, Euler force, or Coriolis force with respect to the first axis, and a second axis perpendicular to the first axis, and a third axis perpendicular to both the first axis and the second axis;
output the first force information from the first sensing mass as a first output to a first time delay circuitry;
apply time delay to the first output using the first time delay circuitry to generate a second output; and
add the first output and the second output using a first adding circuitry coupled to the first time delay circuitry to generate a third output,
wherein the third output only includes the first force information associated with the Coriolis force.

2. The microelectromechanical device of claim 1, wherein the control circuitry is configured to:
sense a second force information from the second sensing mass;
output the second force information from the second sensing mass as a fourth output to a second time delay circuitry;
apply time delay to the fourth output using the second time delay circuitry to generate a fifth output; and
add the fourth output and the fifth output using a second adding circuitry coupled to the second time delay circuitry to generate a sixth output,
wherein the sixth output only includes the second force information associated with the Coriolis force.

3. The microelectromechanical device claim 2, wherein the control circuitry is configured to:
add the third output and the sixth output using a third adding circuitry coupled to the first adding circuitry and the second adding circuitry to generate a seventh output,
wherein the seventh output only includes the first and second force information associated with the Coriolis force.

4. The microelectromechanical device claim 3, wherein the first, second, third, and fourth time delay circuits delay time by a time difference between a first sampling time and a second sampling time,
wherein the first sampling time and the second sampling time are sufficiently close in time so that the Centrifugal force and the Euler force cancel out each other.

5. A microelectromechanical device, comprising:
a first sensing mass and a second sensing mass coupled to an anchor along a first axis, both movable according to the first axis and each movable according to a respective second axis, perpendicular to the first axis;
a driving device configured to maintain the first sensing mass and the second sensing mass in oscillation along the first axis in phase opposition;
control circuitry coupled to the driving device, the control circuitry configured to:
sense a first force information from the first sensing mass, the first force information including information associated with at least one of acceleration force, Centrifugal force, Euler force, or Coriolis force with respect to the first axis, a second axis perpendicular to the first axis, and a third axis perpendicular to both the first axis and the second axis;
output the first force information from the first sensing mass as a first output;
sense a second force information from the second sensing mass, the second force information including information associated with at least one of acceleration force, Centrifugal force, Euler force, or Coriolis force;
output the second force information from the second sensing mass as a second output;
add the first output and the second output using a first adding circuitry to generate a third output;
apply time delay to the third output using a first time delay circuitry to generate a fourth output; and
add the third output and the fourth output using a second adding circuitry coupled to the first time delay circuitry to generate a fifth output.

6. The microelectromechanical device of claim 5, wherein the first time delay circuitry is coupled between the first adding circuitry and the second adding circuitry.

7. The microelectromechanical device claim 6, wherein the first time delay circuitry applies time delay by a time difference between a first sampling time and a second sampling time,
wherein the first sampling time and the second sampling time is sufficiently close in time so that the fifth output does not include components associated with the Centrifugal force and the Euler force.

8. A method for temporal differential sensing, comprising:
sensing a first force information from a first mass moving with respect to a first axis, the first force information including information associated with at least one of acceleration force, Centrifugal force, Euler force, or Coriolis force with respect to the first axis, and a second axis orthogonal to the first axis, and a third axis orthogonal to the second axis;

outputting the first force information from the first mass as a first output to a first time delay circuitry;
applying time delay to the first output using the first time delay circuitry to generate a second output; and
adding the first output and the second output using an adding circuitry to generate a third output.

9. The method of claim 8, comprising:
sensing a second force information from a second mass coupled to the first mass moving with respect to the first axis;
outputting the second force information from the second mass as a fourth output to a second time delay circuitry;
applying time delay to the fourth output using the second time delay circuitry to generate a fifth output; and
adding the fourth output and the fifth output to generate a sixth output.

10. The method of claim 9, comprising:
sensing a third force information from a third mass moving with respect to the second axis;
outputting the third force information from the third mass as a seventh output to a third time delay circuitry;
applying time delay to the seventh output using the third time delay circuitry to generate an eighth output; and
adding the seventh output and the eighth output to generate a ninth output.

11. The method of claim 10, comprising:
sensing a fourth force information from a fourth mass coupled to the third mass moving with respect to the second axis;
outputting the fourth force information from the fourth mass as a tenth output to a fourth time delay circuitry;
applying time delay to the tenth output using the fourth time delay circuitry to generate an eleventh output; and
adding the tenth output and the eleventh output to generate a twelfth output.

12. The method of claim 11, wherein the first, second, third, and fourth time delay circuit delays time by a time difference between a first sampling time and a second sampling time,
wherein the first sampling time and the second sampling time are sufficiently close in time so that the third output only includes the first force information associated with the Coriolis force, the sixth output only includes the second force information associated with the Coriolis force, the ninth output only includes the third force information associated with the Coriolis force, and the twelfth output only includes the fourth force information associated with the Coriolis force.

13. A method, comprising:
sensing a first force information from a first sensing mass and a second force information from a second sensing mass, both the first sensing mass and the second sensing mass coupled to each other with respect to a first axis;
outputting the first force information from the first sensing mass obtained with respect to a second axis transverse to the first axis to generate a first output;
outputting the second force information from the second sensing mass obtained with respect to the second axis to generate a second output;
adding the first output and the second output to generate a third output;
applying time delay to the third output to generate a fourth output; and
adding the third output and the fourth output to generate a fifth output,
wherein the fifth output only includes force associated with Coriolis force.

14. The method of claim 13, wherein applying time delay to the third output to generate a fourth output includes:
delaying by a difference between a second sampling time and a first sampling time.

15. The method of claim 14, comprising:
outputting the first force information from the first sensing mass obtained with respect to a third axis transverse to both the first axis and the second axis to generate a sixth output;
outputting the second force information from the second sensing mass obtained with respect to the third axis and generating a seventh output;
adding the sixth output and the seventh output to generate an eighth output;
applying time delay to the eighth output to generate a ninth output; and
adding the eighth output and the ninth output to generate a tenth output,
wherein the tenth output only includes force associated with Coriolis force.

16. The method of claim 15, wherein the first sampling time and the second sampling time are sufficiently close in time and the fifth output and the tenth output include Coriolis force with respect to the first axis.

17. A method, comprising:
sensing a first force information from a first sensing mass moving along a first axis;
outputting the first force information from the first sensing mass to generate a first output;
applying time delay to the first output to generate a second output;
adding the first output and the second output to generate a third output;
sensing a second force information from a second sensing mass coupled to the first sensing mass moving along the first axis;
outputting the second force information from the second sensing mass to generate a fourth output;
applying time delay to the fourth output to generate a fifth output;
adding the fourth output and the fifth output to generate a sixth output; and
adding the third output and the sixth output to generate a seventh output.

18. The method of claim 17, wherein applying time delay includes delaying by a difference between a second sampling time and a first sampling time,
wherein the second sampling time and the first sampling time are sufficiently close in time such that the seventh output includes only force associated with Coriolis force.

19. The method of claim 18, comprising:
sensing a third force information from a third sensing mass moving along a second axis perpendicular to the first axis;
outputting the third force information from the third sensing mass to generate an eighth output;
applying time delay to the eighth output to generate a ninth output;
adding the eighth output and the ninth output to generate a tenth output;
sensing a fourth force information from a fourth sensing mass coupled to the third sensing mass moving along the second axis;

outputting the fourth force information from the fourth sensing mass to generate an eleventh output;

applying time delay to the eleventh output to generate a twelfth output;

adding the eleventh output and the twelfth output to generate a thirteenth output; and adding the tenth output and the thirteenth output to generate a fourteenth output.

20. The method of claim 19, wherein the fourteenth output includes only force associated with Coriolis force.

* * * * *